United States Patent
Castagno Manasseri et al.

(10) Patent No.: US 8,789,481 B2
(45) Date of Patent: Jul. 29, 2014

(54) SEEDING ASSEMBLY IN GRAIN SEEDING MACHINES

(76) Inventors: Roberto Carlos Castagno Manasseri, Canelones (UY); Carlos Alberto Reymundo Poggio, Canelones (UY)

( * ) Notice: Subject to any disclaimer, the term of this patent is extended or adjusted under 35 U.S.C. 154(b) by 225 days.

(21) Appl. No.: 13/401,298

(22) Filed: Feb. 21, 2012

(65) Prior Publication Data

US 2012/0192775 A1    Aug. 2, 2012

Related U.S. Application Data

(63) Continuation-in-part of application No. 12/830,867, filed on Jul. 6, 2010, now abandoned, and a continuation-in-part of application No. 12/340,059, filed on Dec. 19, 2008, now abandoned.

(30) Foreign Application Priority Data

Dec. 20, 2008  (UY) .......................................... 30828

(51) Int. Cl.
*A01B 49/06* (2006.01)
*A01C 5/00* (2006.01)
*A01C 13/00* (2006.01)

(52) U.S. Cl.
USPC ........... 111/137; 111/165; 111/167; 111/195; 111/926

(58) Field of Classification Search
USPC ............. 111/52–69, 134–137, 149–195, 200, 111/926
See application file for complete search history.

(56) References Cited

U.S. PATENT DOCUMENTS 3,094,011 A * 6/1963 Bradley .......................... 74/441
4,116,140 A * 9/1978 Anderson et al. ............. 111/136

* cited by examiner

*Primary Examiner* — Christopher J Novosad
(74) *Attorney, Agent, or Firm* — Donald J. Ranft; Collen IP

(57) ABSTRACT

An articulated device for controlling seeding depth of a seeding assembly in grain seeding machines, more precisely, a seeding assembly with a hinge mechanism in the front part of the assembly, which allows control of the distance between the depth control wheel and the opener disk. This allows minimizing the entrance of vegetable residues, dust and moist soil, while also aiding in their expulsion, and provides an efficient and prompt way for cleaning to avoid longer out of service times of the machine.

7 Claims, 6 Drawing Sheets

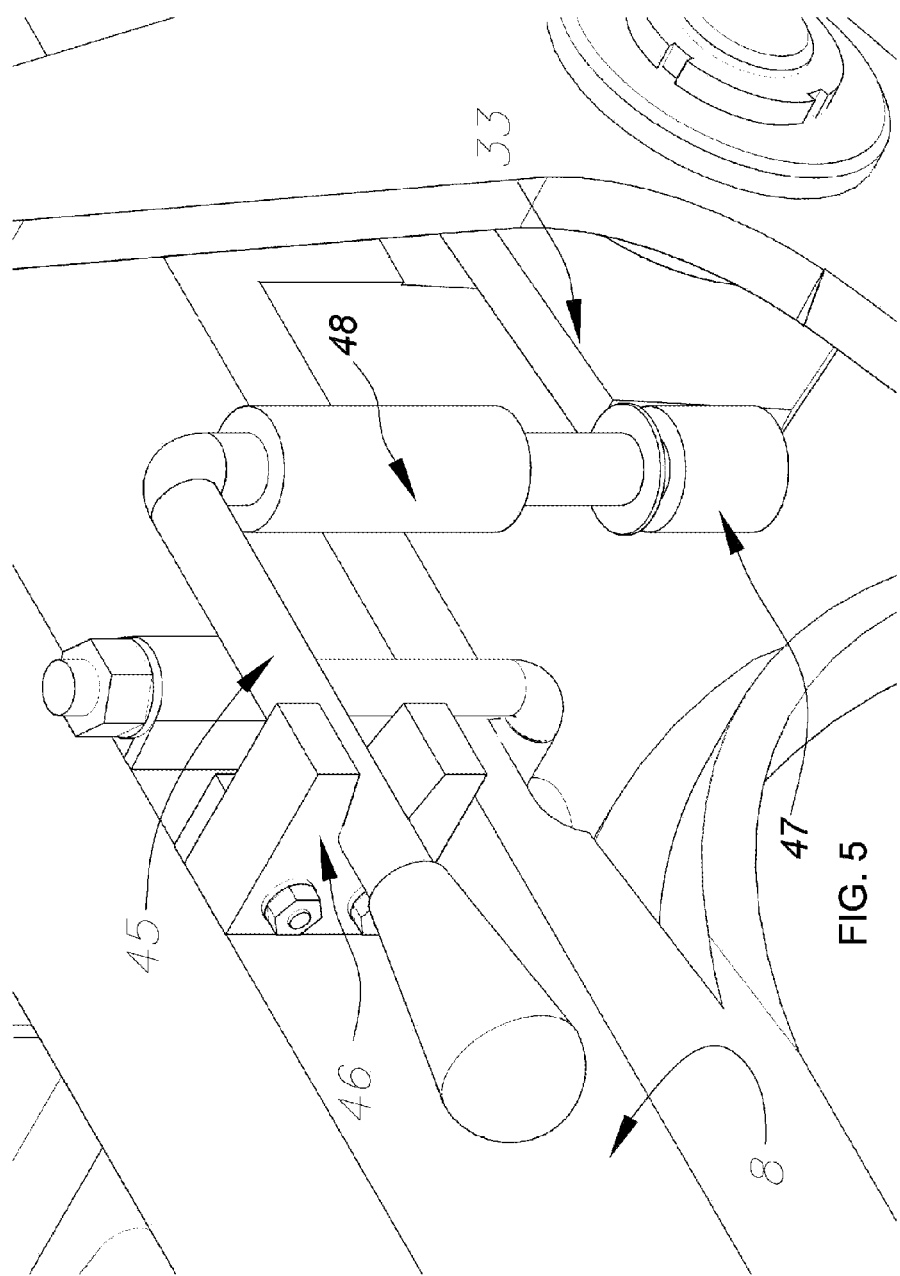

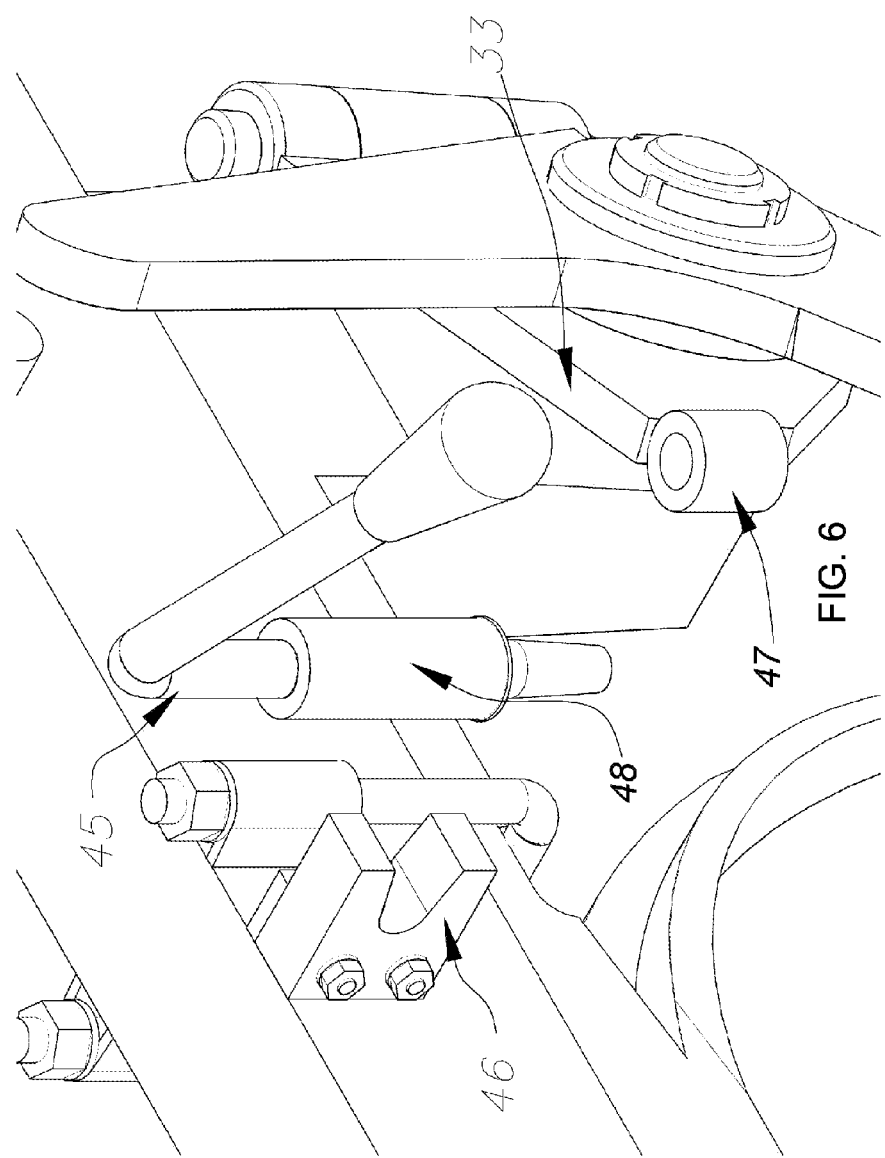

SEEDING ASSEMBLY IN GRAIN SEEDING MACHINES

This application is a continuation in part of application Ser. No. 12/830,867 filed on Jul. 6, 2010 which is a continuation in part of application Ser. No. 12/340,059 filed Dec. 19, 2008. The disclosures of Ser. No. 12/340,059 and Ser. No. 12/830,867 are fully incorporated into this application.

BACKGROUND OF THE INVENTION

This innovation originates from the constant improvement searched on grain seeding machines, particularly, those used for so-called direct seeding or no-till seeding.

Moreover, Argentinean registrations of Invention Patents, belonging to the firm named Avec S.R.L, such as:

No. 247466—Dispositivo óleo—neumático de control de cargas (Oil pneumatic load control device)

No. 249176—Mejoras en un dispositivo óleo—neumático de control de cargas (Improvements on an oil-pneumatic load control device)

No. 250967—Conjunto articular de brazo principal y balancín (Joint assembly of main arm and balance beam)

are the background based on which, upon constant operation development and improvement, the present innovation is produced.

The Oil-pneumatic Load Control Device, together with the Balance Beam System, provides exact regulation of the preset loads based on the soil to be seeded. The loads are therefore kept constant at all times, regardless of the unevenness of the soil. Therefore, a constant load combined with the perfect tracing of the soil guarantees uniformity in seeding depth followed by the appropriate covering.

The problem associated to this study is a result of the obstruction with vegetable residues, dust or moist soil, which enter between some of the components of the so called "seeding assembly" or "seeding train".

The development of this invention is inspired on the arrangement of the known seeding assembly elements, the fact that said assemblies are rigidly conformed, and the poor adaptability for their self cleaning or evacuation of the vegetable residues, dust, etc. One object of this invention is to improve adaptability of the assembly, achieve an easy and correct evacuation of the accumulated residues and provide the user of the seeder higher effectiveness, work efficiency, and most importantly, the minimization of detention time caused by obstruction of the seeding assembly.

Generally seeding assemblies include the following:
a) A device to open the furrow, usually composed of one or two flat disks 1 (single disk, double disk), mounted with a certain inclination in relation to vertical and horizontal planes, which allows them to perform such task, or composed of a kind of spike or hoe (not shown) (see FIG. 1);
b) A device to place the seed from a storage hopper (not shown) to the bottom of the furrow, generally consisting of a flexible tube (not shown) connected to a rigid tube 2 placed between both disks or on the side of the single disk;
c) A device to place fertilizer from a storage hopper (not shown) to the bottom of the furrow, generally consisting of a flexible tube (not shown) connected to a rigid tube 3 placed between both disks or at the side of the single disk (this is what commonly occurs when fertilization and seeding take place simultaneously);
d) A device to control depth of the seed in the furrow; this may be carried out by rings laterally attached to one of the furrow disks (or to the single disk) (not shown), or either by one or two wheels with rubber tires 4 indicated on FIG. 1; in the case of rings, the different depths are regulated by varying the size (diameter) of the rings; whereas in the case of wheel(s) there is a specifically designed mechanism 5 for said regulation of depth, for example the one indicated on FIG. 1;
e) A device to close the furrow, which usually consists of one or two wheels with rubber tires 6; to which serrated disks are normally attached;
f) There are some designs which also include a device which presses the seed against the furrow walls, after said seed has been placed therein and before closing the furrow; generally said device is a metal wheel 7 or it includes a rubber or plastic tire.

The above mentioned elements from a) to f) are well known in the previous art and can have different designs, therefore any constructive details about them will be given. They are usually placed on a so called balance beam 8 on the present invention and on the above mentioned Argentinean patents, generally a straight one, ordered in such a way that they operate with the correspondent sequence (furrow opening up to certain depth; placing of the seed and fertilizer; seed pressing; furrow closing).

SUMMARY OF THE INVENTION

The present invention describes a new arrangement of the elements available in "seeding assembly or seeding train", understood as the set of structural elements and mechanisms needed to perform seeding work on a single furrow, therefore it is necessary on a typical grain seeder, to have several seeding assemblies placed next to each other, in one or more toolbars, to cover the seeding width and the distance between furrows needed. Said new arrangement not only improves and provides better efficiency to the work on general terms, it also perfects the depth control system, provides adaptability to the assembly, and moreover, innovates the mechanism, providing regulation and articulation which improves self cleaning of its elements; by both minimizing the amount of residues entering the assembly and providing to said residues an easy way out of it.

In summary, the assembly herein introduced, achieves, by means of its new arrangement and modification of the elements, a more efficient operation, improvement of the depth control system and simplification of the cleaning of the assembly through the new arrangement of its regulation and articulation of the mechanism.

BRIEF DESCRIPTION OF DRAWINGS

The advantages of this invention will be apparent upon consideration of the following detailed disclosure of the invention, especially when considered with the accompanying drawings wherein:

FIG. 5 is a view of the lock in closed position.

FIG. 6 is a view of the lock in open position.

DETAILED DESCRIPTION

The innovation presented herein develops from the complications registered, which have been observed, and which are associated to the practical use of the grain seeders in general.

However, particularly we refer to the seeder which applies the oil-pneumatic device patented under number 247466, which produced the first modification or improvement in patent under number 249176 "Improvements on an oil pneumatic load control device . . . " which was finally modified in patent under number 250967 "Joint assembly of main arm and balance beam, applied to agricultural machines".

In said invention patent (250967) the elements of the joint assembly are described, featuring a main arm, on one end articulated to the machine frame, on the other end articulated to a bracket projected underneath thereof, inside which there is an area crossed by the balance beam, the latter articulated to spin in a transversal shaft which is provided in the bottom end of said bracket; the balance beam is joint to the furrow opener disks through a connecting piece fixed to one end of the balance beam, whereas the covering wheel which is part of the arrangement, is fixed—by means of sliding mounted clamps—in adjustable position on the side of the balance beam opposite to the referred articulated bracket.

Figure 1:
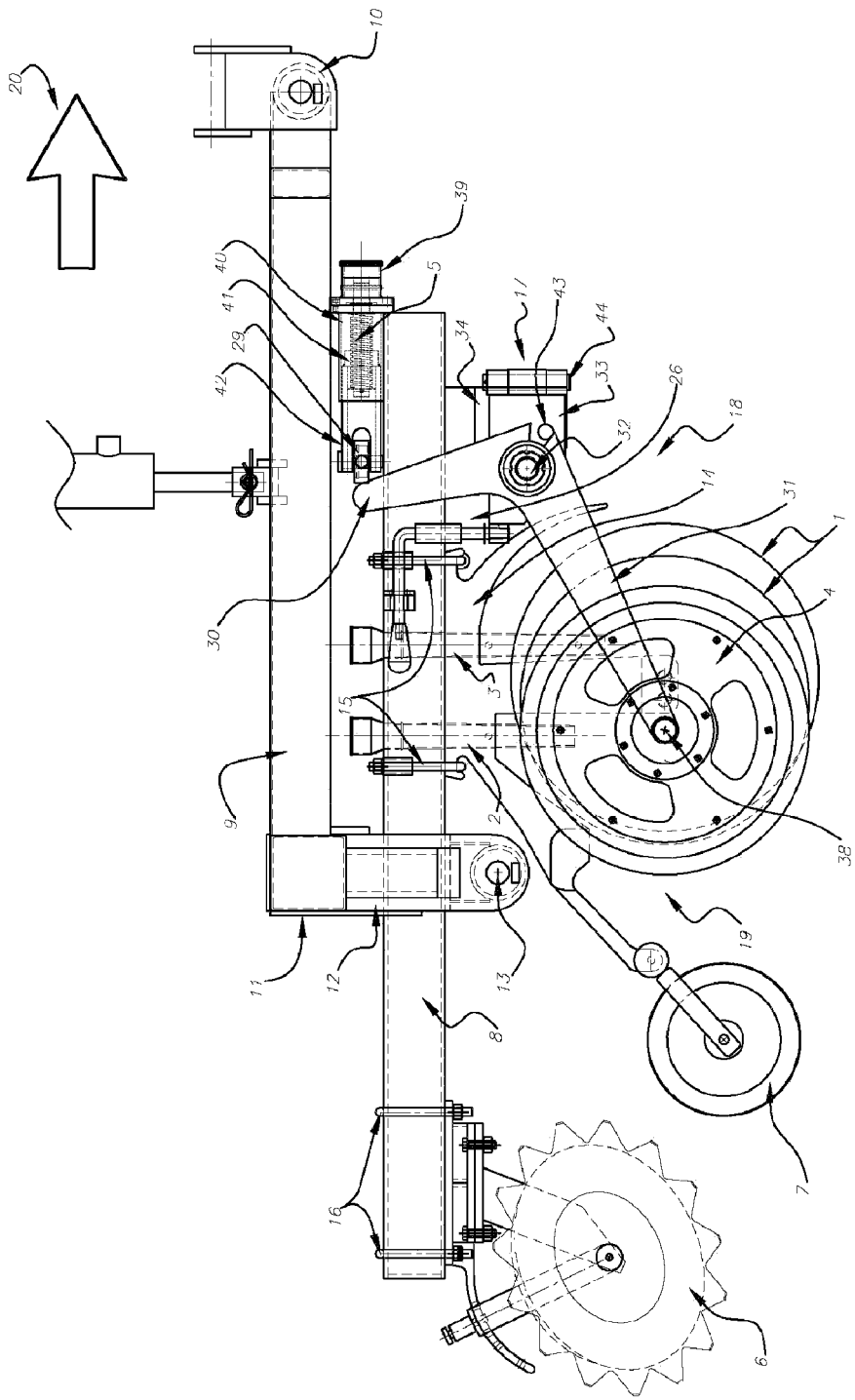
FIG. 1 is a side view of the seeding assembly.

The new joint assembly proposed features the arrangement of the elements involved on the seeding assembly as shown on FIG. 1, characterized by a main arm 9, on one end 10 articulated to the machine frame (partially shown) which allows it to move upwards and downwards, having on the other end 11 a bracket 12 projected underneath thereof, inside which there is an area crossed by the balance beam 8, the latter articulated to spin in a transversal shaft 13 which is provided in the bottom end of said base; the balance beam 8 is joint through a connecting piece 14 fixed to one sector of the balance beam 8 by means of "U" shaped clamps 15, to the furrow opener disks 1, the depth control wheels 4 and the seed press wheel 7, whereas on the sector of the balance beam 8 located on the opposite side of said articulation bracket 12, the covering wheel 6 is fixed, by means of sliding mounted "U" shaped clamps 16, in adjustable position on said balance beam 8. The main arm 9 is actuated upwards or downwards with a certain and preset force depending on seeding conditions, by means of a hydraulic cylinder (only partially shown) which is part of the oil pneumatic load control device mentioned above.

One of the objects of the present invention is the new design of the depth control system, which improves its functionality. Moreover, the new arrangement and modification of the present invention minimizes the entrance of elements, such as vegetable residues, dust, moist soil, etc., into the existing space between the wheel and the disk, in turn improving evacuation of the few elements that enter the assembly.

Figure 2:
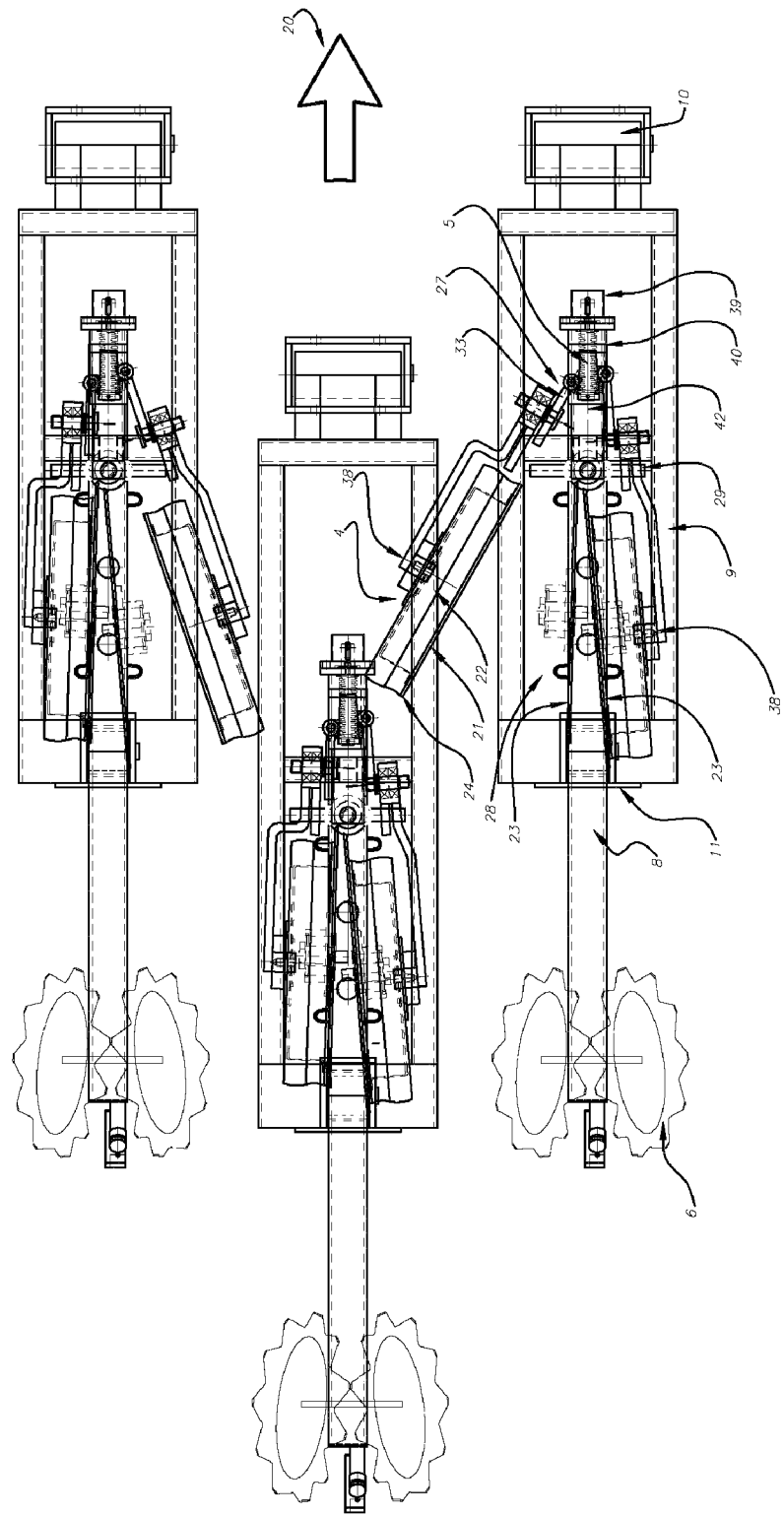
FIG. 2 is a top view of three adjacent seeding assemblies with the depth control wheels in different positions.
Figure 4:
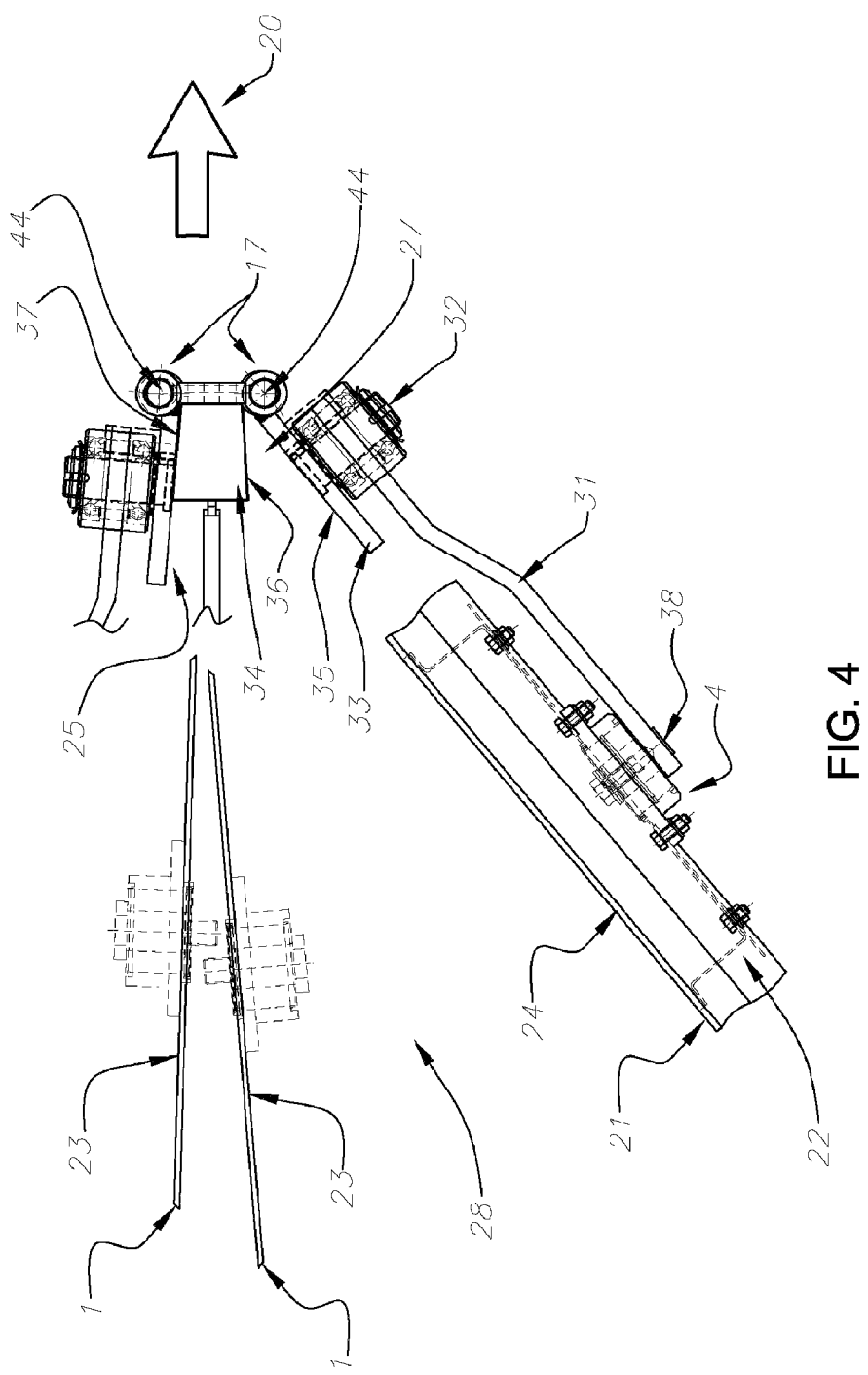
FIG. 4 is a top view of hinges in closed and open positions.

A further improvement applied to the invention is the conformation of a hinge mechanism or hinged articulation 17 as the one shown on FIG. 1, FIG. 2 and FIG. 4, which provides, firstly, regulation of the seeding depth and, secondly, articulation of the elements of the mechanism, achieving minimized detention times of the machine for cleaning the seeding assemblies.

A preferred embodiment shall be described with precision in the following paragraphs, making reference to the attached descriptive drawings. The purpose is to describe the invention without limiting it, and the components may be selected from different equivalents, without deviating from the invention principles defined in the present document. The invention is described based on the above mentioned Argentinean patent No. 250967, "Joint assembly of main arm and balance beam . . . ", where almost all the set of mechanisms are already known, but with the new arrangement as shown on FIG. 1 and FIG. 2, where some of the elements of the seeding assembly or seeding train have been redesigned and/or redistributed.

In already known arrangements, the depth control wheels may be located in the front or rear of the furrow opener disks with the running direction being considered the front part/forward portion 20 of the seeding assembly.

Figure 3:
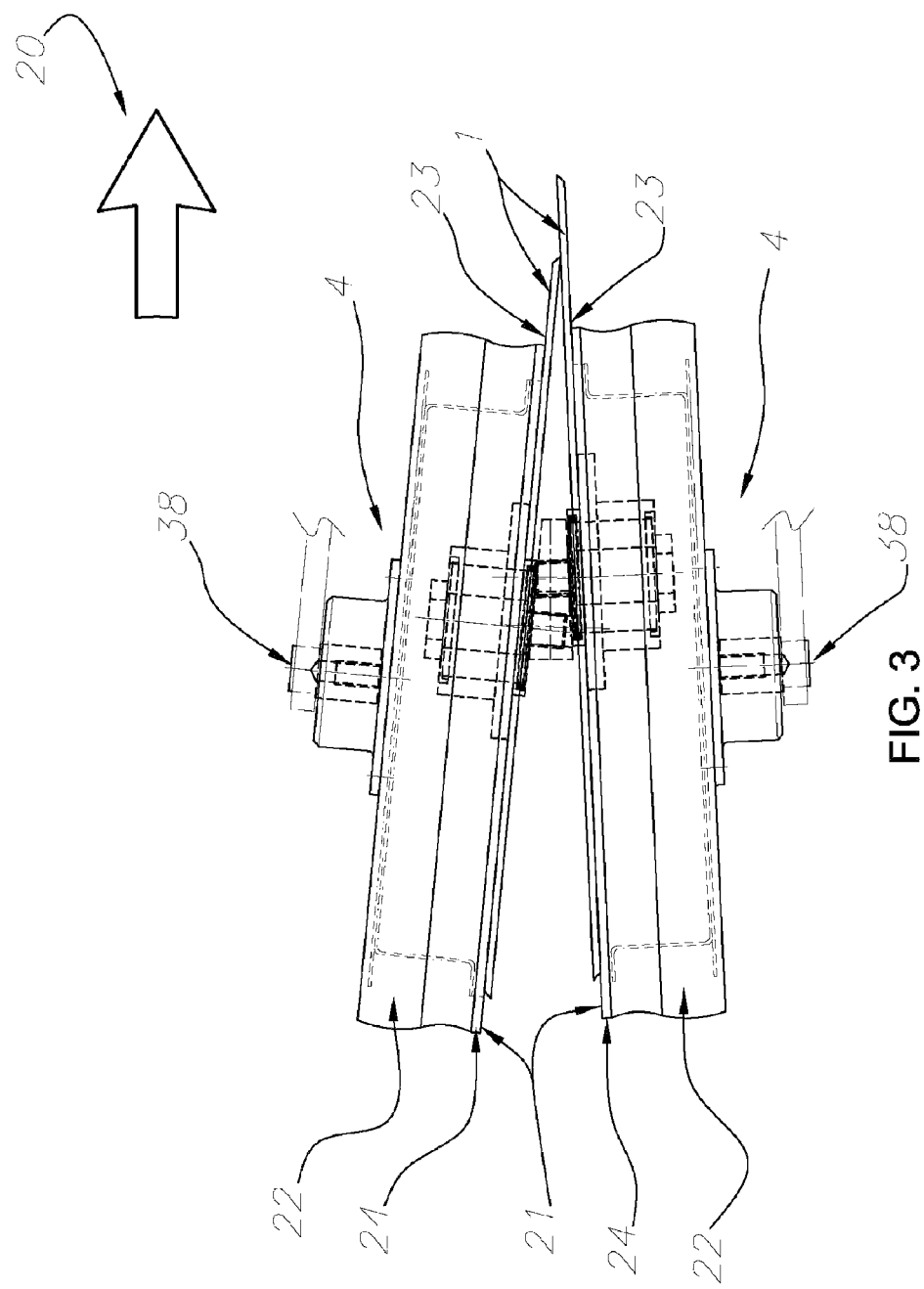
FIG. 3 is a top view of depth control wheels and disks on the closed position of hinges.

In the preferred embodiment, shown as a set on FIG. 1 and FIG. 2, the arms 31 have on one of its ends a shaft 38 which rotationally supports the depth control wheels 4. The other end of the arm 31 rotates vertically on the shaft/pin 32 fixed to the mobile plate 33 of the hinge 17. The mobile plate 33 of hinge 17 allows the arm 31 to rotate horizontally, and is located at the front part 18 of the furrow opener disks 1. To better perform its function, the internal side faces 21 of the rubber tires 22 of the depth control wheels 4 must be as close as possible to the external side faces 23 of furrow opener disks 1, as shown on FIG. 3. The tires 22 of the depth control wheels 4 include a kind of "lip" 24 in their internal side faces 21 and during operation of the seeder assembly is positioned adjacent to the external side face 23 of furrow opener disks 1. This position is maintained at all times during the upward and downward movement of the tires 22 of the depth control wheels 4 respect to the furrow opener disks 1 when the seeding depth control function is carried out.

Since the seeding operation in general terms and of the no-till seeding in particular is carried out on vegetable residues and coverings, the operation of the seeding assembly introduces these vegetable residues and coverings, along with dust and moist soil into the space between the depth control wheels and the furrow opener disks. This causes several problems, the most important of them being the reduction of the performance of the machine, due to the frequent detention of the operation for cleaning seeding assemblies This introduction of unwanted debris can also hinder proper seeding. These operation problems have originated the necessity to improve the previous seeding assembly designs, taking into account these difficulties perceived during field work.

The present invention consists essentially of a set of mechanisms, based mostly on Invention Patent No. 250967 "Joint assembly of main arm and balance beam . . . ", in which the new arrangement of the elements provides a simple cleaning of the space between the depth control wheels 4 and furrow opener disks 1, minimizing the detention/out of service time of the machine. This is achieved by means of the hinged articulation (or simply "hinge") 17 shown on FIG. 1 and FIG. 4. The location of the hinge 17 at the front part 18 of the furrow opener disks 1, enables the forces involved in the seeding assembly operation to bring the internal side face 21 of the rubber tire 22 of the depth control wheels 4 closer to the external side face 23 of the furrow opener disks 1 (see FIG. 2 and FIG. 3). The seeding assembly is typically to be designed to allow a minimum separation between the two faces in regular working conditions, to be no greater than 0.012/0.020 inches or 0.3/0.5 mm. This separation is unaffected by the vertical position of the depth control wheel 4 with respect to the furrow opener disks 1 (upper or lower position depending on the seeding depth needed), since the movement is always on a plane parallel to the external side face 23 of the furrow opener disks 1. On the contrary, if the hinge 17 was located the rear part/rearward portion 19 of the furrow opener disks 1, the depth control wheels 4 would tend to separate from the furrow opener disks 1, allowing easier entrance of the unwanted elements. However, location of the attachment of the depth control wheels to the front part of the furrow opener disks is not an innovation, since some seeders already include it.

The innovation herein basically consists of a hinge 17, which in closed position 25 indicated on FIG. 4, makes internal side face 21 of the rubber tire 22 of the depth control wheels 4 to be positioned adjacent to external side face 23 of the furrow opener disks 1. This position remains perfectly fixed through a lock 26, and in open position 27, shown on FIG. 2 and FIG. 4, allows the depth control wheels 4 to be separated from the furrow opener disks 1 by means of an angular movement, facilitating the cleaning of the extended space 28 between them, as shown on FIG. 2 and FIG. 4.

One embodiment of a locking mechanism 26 is shown on the FIGS. 1, 5 and 6 with FIG. 5 showing it in the closed position, and FIG. 6 showing it in the open position. A handle 45 is typically made of a piece of round steel, curved 90°, and shaped as an "L". The part of this piece in horizontal position in FIG. 1 which would be the longer part of the "L", is the actual handle; and is manually moved to lock or unlock the mechanism. The shorter part of the "L", shown in a vertical position on FIG. 1 is the part used for the actual lock and its bottom end is conical. This vertical part of the handle 45 includes a stop shaped as a washer, to limit the upwards and downwards movement of the handle 45, that is, both when the lock 26 is released (upwards movement) or when lock 26 is fixed (downwards movement).

A metallic housing with a conical hole, indicated as 47 in FIG. 5, is welded to the mobile plate 33 of hinge 17, and is used to hold the conical bottom end of the vertical part of handle 45, and allow the mobile plate 33 of hinge 17 to be locked in a closed position.

A guide piece 48 through which the vertical part of the handle is inserted, is welded to the balance beam 8 of the seeding assembly. The function of this guide piece 48 is to allow the vertical part of handle 45 to turn around its own axle, and to move upwards and downwards, so that when handle 45 is lifted and turned, the lock 26 is released, since the conical end of the lower part of handle 45 is pulled out of the conical housing 47 welded to the mobile plate 33 of hinge 17. Thus, when the mobile plate 33 from hinge 17 is released, it may have an angular movement and create a larger space 28 between the depth control wheels 4 and the furrow opener disks 1, as represented in FIG. 2 and FIG. 4. Once cleaning and/or maintenance of the seeding assembly is carried out, the mobile plate 33 of hinge 17 should be closed again by setting it in the working position. This is accomplished by placing the mobile plate 33 as close as possible to the fixed plate 34, both of hinge 17, and by manually activating lock 26, in this case turning and lowering the vertical part of handle 45, until its entire conical end is introduced in the conical housing 47 which is welded to the mobile plate 33 of hinge 17.

A safety piece 46, fixed with bolts to the balance beam 8 of the seeding assembly, allows the horizontal part of handle 45 to stay fixed during the seeding process. This safety piece 46 prevents handle 45 from accidentally turning round or lifting during the seeding process. This guarantees that lock 26 is in the closed position. Should it be necessary to release lock 26 to open hinge 17, it is done by applying a horizontal force on handle 45, and once it is released, turning and lifting the handle to pull out the lower part with the conical end of handle 45 of the conical housing 47, which is welded to the mobile plate 33 of hinge 17.

As shown on FIG. 1 and FIG. 2, depth regulation is carried out by operating, for example, a mechanism utilizing a square—threaded screw 5. In the design shown on FIG. 1 and FIG. 2, the screw 5 can be rotated by operating the steering wheel 39, located on one of its ends, and it is positioned inside a square—section tube 40. In turn, the rotation of the screw 5 causes movement of a nut 41 on it, from right to left or vice versa, as shown on FIG. 1 and FIG. 2. In the present design, the above mentioned nut 41 is attached to a piece 42 that in this case consists of a tube of square section which can telescopically move within the abovementioned tube 40 where the screw 5 is located. In turn, the free end 29 of the piece 42 attached to the nut 41 has a joint designed for allowing it to act on the levers 30 attached to the arms 31 of the depth control wheels 4. That is, the rotating drive of the screw 5 causes movement to the right or left of the articulated end 29, which in turn acts on the levers 30, that being attached to the arms 31 of the depth control wheels 4, allows them to move down or up, drawing an arc of a circle. In addition, the arm 31—lever 30 set has an angular stop 43 in the external side face of the mobile plate 33 of the hinge 17. This angular stop 43 is designed in such a way that any displacement of the depth control wheel 4 drawing an arc of a circle is limited to what is needed to obtain the minimum and maximum seeding depths specified for the machine. The articulated end 29 of the depth control mechanism, provides free and separate movement of both depth control wheels 4 of the system.

We shall describe the invention based on Invention Patent No. 250967, "Joint assembly of main arm and balance beam . . . ", where the whole set of mechanisms is almost completely known, but including the new arrangement, as shown in FIG. 1, in which some of the elements of the seeding assembly or seeding train have been redesigned and/or redistributed.

The hinge 17 shown on FIG. 1 and FIG. 4 mounted on mobile plate 33 allows the internal side face 21 of the tire 22 of the depth control wheels 4 to be positioned at a minimum distance of the external side face 23 of the furrow opener disks 1 and is fixed in that location by the lock 26, for example of the design indicated on FIGS. 1, 4 & 5. In the current design the fixed plate 34 of the hinge 17 is a part of the connecting piece 14. The mobile plate 33 is articulated with the fixed plate 34 by means of a pin 44 designed for this purpose. The internal side face 35 of the mobile plate 33 and the internal side face 36 of the fixed plate 34 of the hinge 17 are flat, and in closed position 25 are parallel to each other, making contact throughout the area 37 they have in common, and are in turn parallel to the external side face 23 of the corresponding furrow opener disks 1. The shaft 32 is fixed to the mobile plate 33 of the hinge 17 perpendicular to the internal side face 35 thereof.

Placing the hinge 17 in an open position 27, brings the depth control device the necessary larger space 28 between the depth control wheels 4 and the furrow opener disks 1, for a proper and prompt cleaning.

The use and practice of the seeding machinery which showed the inconveniences of the obstruction with residues encouraged to place and use the hinge articulation 17, and the new arrangement of the fixing assembly of depth control wheels 4, which being on its preferred embodiment located at the front part 18 of the furrow opener disks 1, takes advantage of the components of the acting forces over the different elements during seeding tasks, helping to maintain the minimum distance between the internal side face 21 of the tire 22 of the depth control wheels 4 and the external side face 23 of the furrow opener disks 1.

One embodiment is disclosed and its application defined above without this implying a limitation, to the specific embodiment disclosed. The above disclosure illustrates various concepts, structures, us and techniques which are the subject of this patent it will now be apparent to those of ordinary skill in the art that other embodiments incorporating these concepts structures and techniques may be used. Numerous embodiments utilizing different types and locations of the locking mechanism, and different arrangements of the articulating hinge are apparent to those of ordinary skill in the art. Accordingly it is submitted that the scope of the patent should not be limited to the described embodiments, but rather should be limited only by the spirit and scope of the following claims. Specification, claims and attached drawings, which further complement the description of the invention.

The invention claimed is:

1. A device for controlling a seeding assembly of a seeding machine comprising:
    a beam extending from a front portion of the seeding machine to a rear portion of the machine;

a minimum of one furrow opener disk attached to the beam;
a minimum of one depth control wheel mounted on an arm;
a horizontally opening hinge wherein one plate of the hinge is attached to the beam and the arm with the mounted depth control wheel being attached to a second plate/mobile plate of the hinge allowing horizontal movement of the arm.

2. A device according to claim 1 wherein the depth control wheel is rotationally supported by a pin on one end of the arm and the other end of the arm is supported on a pin on the second plate of the hinge.

3. Device according to claim 2 further comprising a lever on the arm wherein a position of the lever and thus the arm and depth control wheel is vertically adjustable.

4. A device according to claim 3, in which the position of the lever and thus the arm and depth control wheel is controlled by a screw which actuates on the lever.

5. A device according to claim 4 further comprising a locking mechanism to hold the arm in a fixed position relative to the furrow opener disk.

6. A device according to claim 3 further comprising a locking mechanism to hold the arm in a fixed position relative to the furrow opener disk.

7. A device according to claim 1 further comprising a locking mechanism to hold the arm in a fixed position relative to the furrow opener disk.

* * * * *